United States Patent
Bae et al.

(10) Patent No.: US 9,594,444 B2
(45) Date of Patent: Mar. 14, 2017

(54) HAPTIC FEEDBACK METHOD AND APPARATUS AND MACHINE-READABLE STORAGE MEDIUM

(71) Applicant: Samsung Electronics Co., Ltd., Gyeonggi-do (KR)

(72) Inventors: Yu-Dong Bae, Gyeonggi-do (KR); Eun-Hwa Lee, Gyeonggi-do (KR); Jeong-Seok Lee, Gyeonggi-do (KR); Young-Min Lee, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 115 days.

(21) Appl. No.: 13/683,579

(22) Filed: Nov. 21, 2012

(65) Prior Publication Data
US 2013/0127759 A1   May 23, 2013

(30) Foreign Application Priority Data
Nov. 23, 2011   (KR) .................. 10-2011-0122999

(51) Int. Cl.
*G06F 3/041* (2006.01)
*G06F 3/01* (2006.01)

(52) U.S. Cl.
CPC .............. *G06F 3/041* (2013.01); *G06F 3/016* (2013.01); *G06F 2203/013* (2013.01)

(58) Field of Classification Search
CPC ..... G06F 3/016; G06F 3/041; G06F 2203/013
USPC .................. 345/156, 161, 173; 463/36–38
See application file for complete search history.

(56) References Cited

U.S. PATENT DOCUMENTS

| | | | |
|---|---|---|---|
| 5,959,613 A * | 9/1999 | Rosenberg | A63F 13/06 341/20 |
| 8,294,557 B1 * | 10/2012 | El Saddik et al. | 340/407.1 |
| 8,542,105 B2 * | 9/2013 | Grant et al. | 340/407.1 |
| 2002/0080112 A1 * | 6/2002 | Braun | G06F 3/016 345/156 |
| 2002/0163498 A1 * | 11/2002 | Chang | G06F 3/016 345/156 |
| 2008/0294984 A1 | 11/2008 | Ramsay et al. | |
| 2009/0079690 A1 * | 3/2009 | Watson et al. | 345/156 |
| 2009/0295552 A1 * | 12/2009 | Shahoian | G06F 3/016 340/407.1 |
| 2010/0261526 A1 * | 10/2010 | Anderson | G06F 3/016 463/31 |
| 2011/0018813 A1 * | 1/2011 | Kruglick | 345/173 |
| 2012/0081276 A1 * | 4/2012 | Ullrich et al. | 345/156 |
| 2014/0358505 A1 * | 12/2014 | Hashash | G06F 17/5009 703/2 |

OTHER PUBLICATIONS

Gunhyuk Park et al., "The Dynamics Haptics Library: Real-time Vibrotactile Rendering Library Using Dynamics Engine", ISUVR2011 Poster session, Jul. 3, 2011.

* cited by examiner

*Primary Examiner* — Amare Mengistu
*Assistant Examiner* — Jennifer Zubajlo
(74) *Attorney, Agent, or Firm* — The Farrell Law Firm, P.C.

(57) ABSTRACT

A haptic feedback method includes providing a user with an image that is updated based on a collision event, generating collision data including a type of the collision event and an impulse amount, generating a haptic pattern based on the collision data, and generating a vibration based on the haptic pattern.

12 Claims, 5 Drawing Sheets

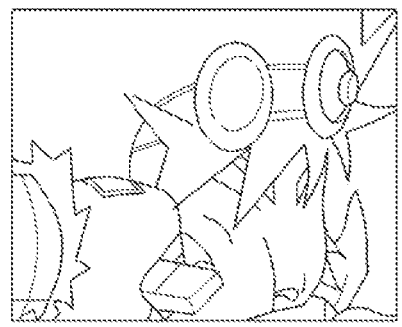
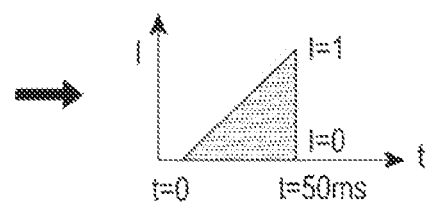
FIG.8A  FIG.8B
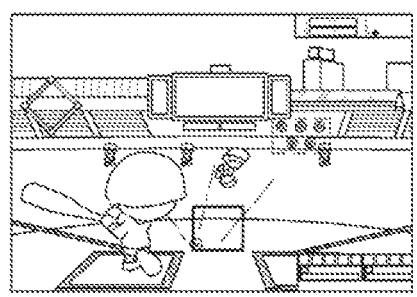
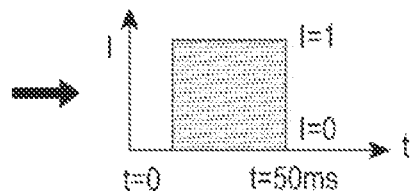
FIG.9A  FIG.9B

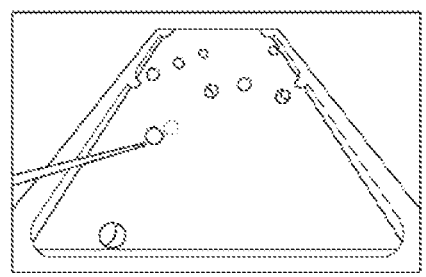 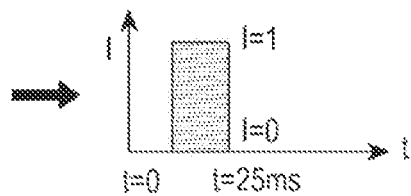
FIG.10A        FIG.10B
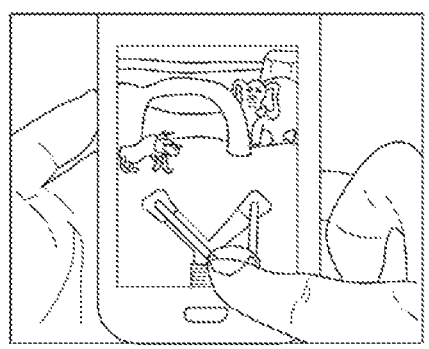 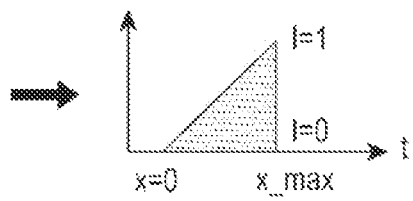
FIG.11A        FIG.11B

HAPTIC FEEDBACK METHOD AND APPARATUS AND MACHINE-READABLE STORAGE MEDIUM

PRIORITY

This application claims priority under 35 U.S.C. §119(a) to Korean Application Serial No. 10-2011-0122999, which was filed in the Korean Intellectual Property Office on Nov. 23, 2011, the contents of which are incorporated herein by reference.

BACKGROUND OF THE INVENTION

1. Field of the Invention

The present invention relates generally to a haptic feedback method, and more particularly, to a haptic feedback apparatus and method for automatically generating a haptic feedback pattern based on data associated with physical parameters in a game application and data associated with an environment or an event situation when video content such as a game is executed in a portable device or a console in which a haptic actuator is included or attached.

2. Description of the Related Art

A conventional haptic feedback method is based on an event, and most conventional methods manually generate a haptic pattern appropriate for an event, and load the library and immediately execute an appropriate haptic pattern when an event occurs in a game.

The game may be a real-time application, and may reconfigure an image in real time as opposed to providing an image over time. The game application may update at regular intervals so as to proceed with the game, may render a screen based on given information for displaying, and may automatically sense an event which provides an effect such as sound or vibration. In this example, the game application generally loads a sound source or a vibration pattern included in the library so as to drive a speaker or a motor. The game application performs updating when an external input such as a keyboard exists, or automatically proceeds with the game using an artificial intelligence engine.

The greatest difficulty of the conventional technology is that it requires a larger number of libraries to be generated and stored as the number of types of events increases, since haptic patterns are stored based on a library scheme. The performance of portable terminal hardware has been significantly improved following the introduction of smart phones and thus, realistic game expression is increasing and various types of events will be provided. A size of a game application may become large when a library is large and thus, an effective haptic feedback may be compromised.

The library scheme requires a game developer to create an optimal pattern that is appropriate for an event. However, most game developers may not be aware of an actuator feature and thus, developing an appropriate pattern may be difficult. Also, it may be time-consuming to produce a haptic pattern and, in turn, for producing a game application.

SUMMARY OF THE INVENTION

Accordingly, an aspect of the present invention is to solve at least the above-described problems occurring in the prior art, and to provide at least the advantages described below.

Another aspect of the present invention is to provide a method of automatically generating a haptic pattern using a physical parameter in an actual game application and feeding back the generated haptic pattern so as to improve reality and immersion, as opposed to designing, by a game developer, a vibration effect based an event, and a method of generating a haptic pattern based on a feature of a haptic actuator. Therefore, haptic feedback is performed in cooperation with image data in a game using a physics engine and thus, reality is improved and a game developer may readily design a haptic feedback.

In accordance with an aspect of the present invention, a haptic feedback method includes providing a user with an image that is updated based on a collision event, generating collision data including a type of the collision event and an impulse amount, generating a haptic pattern based on the collision data, and generating vibration based on the haptic pattern.

In accordance with an aspect of the present invention, a haptic feedback apparatus includes a display unit which provides a user with an image that is updated based on a collision event, a controller which generates collision data including a type of the collision event and an impulse amount, and which generates a haptic pattern based on the collision data, and an actuator which generates vibration based on the haptic pattern.

BRIEF DESCRIPTION OF THE DRAWINGS

The above and other aspects, features, and advantages of the present invention will be more apparent from the following detailed description taken in conjunction with the accompanying drawings, in which:

FIGS. 4A through 6B illustrate a change in a form of a haptic pattern based on the stiffness of collision targets;

FIGS. 8A through 11B illustrate various haptic patterns based on a type of game.

DETAILED DESCRIPTION OF EMBODIMENTS OF THE PRESENT INVENTION

Hereinafter, embodiments of the present invention will be described with reference to the accompanying drawings. In the following description of the present invention, a detailed description of known functions and configurations incorporated herein will be omitted for the sake of clarity and conciseness.

Figure 1:
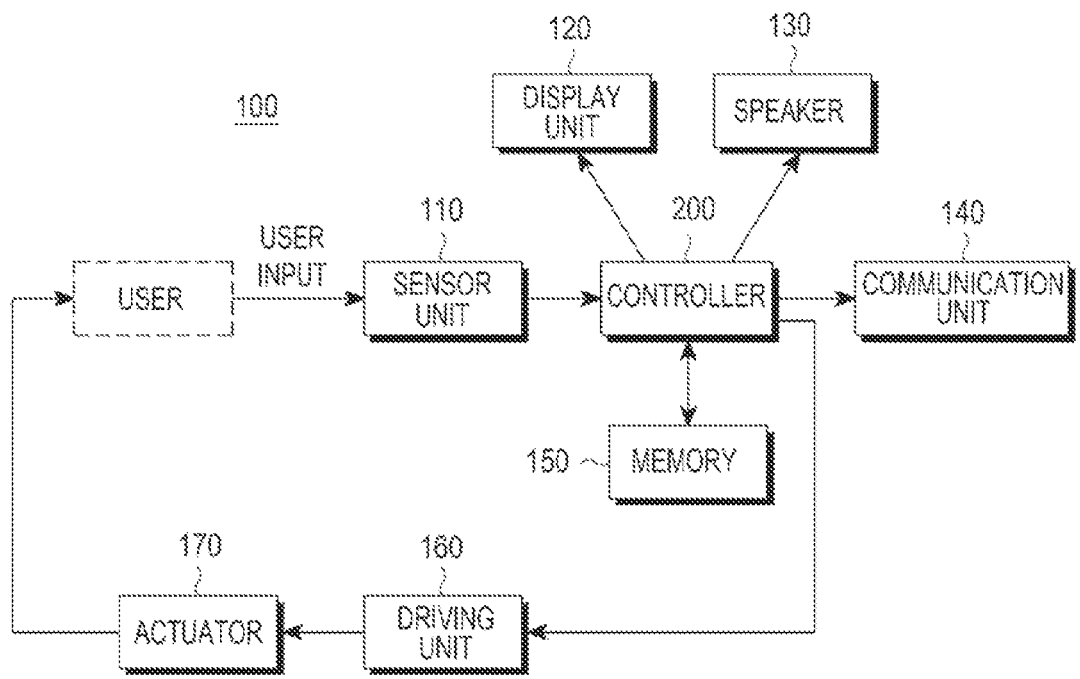
FIG. 1 illustrates a haptic feedback apparatus according to an embodiment of the present invention.

FIG. 1 illustrates a haptic feedback apparatus according to an embodiment of the present invention. A haptic feedback apparatus 100 includes a sensor unit 110, a display unit 120, a speaker 130, a communication unit 140, a driving unit 160, an actuator 170, a memory 150, and a controller 200. The haptic feedback apparatus 100 may further include a camera and a microphone (not shown). The haptic feedback apparatus 100 is one that provides a haptic feedback, such as a portable terminal, a cellular phone, a console, or a Personal Digital Assistant (PDA).

The sensor unit 110 may be embodied as a gyro-sensor, a touch screen sensor (that is, a touch panel), or a keypad including a plurality of key buttons, and detects a location of a user input, a direction, an acceleration, a pressure, and key information, and transfers the detected user input data to the controller 200. The sensor unit 110 may be embodied as a camera that detects a movement of an object such as a hand movement of the user, and recognizes the movement as a user input.

The display unit 120 displays, to the user, image data received from the controller 200, and provides the user with an image that is updated periodically and/or based on an event.

A Liquid Crystal Display (LCD) or a touch screen may be used as the display unit 120.

The speaker 130 converts sound data received from the controller 200 into a sound wave for outputting.

The communication unit 140 may perform wired or wireless communication, and receives a wireless downstream signal from air via, for example, an antenna, and outputs, to the controller 200, downstream data obtained by demodulating the wireless downstream signal. The communication unit 140 modulates upstream data input from the controller 200 so as which generates a wireless upstream signal, and transmits the generated wireless upstream signal into air via an antenna. The modulation and demodulation may be performed based on a Code Division Multiple Access (CDMA) scheme, a Frequency Division Multiplexing (FDM) scheme or a Time Division Multiplexing (TDM) scheme.

The memory 150 may store applications having various functions such as a game function and a communication function, images which provide related Graphical User Interfaces (GUIs), user information, databases associated with information such as documents, background images required for driving the haptic feedback apparatus 100 (a menu screen or an idle screen), and operating programs.

Figure 2:
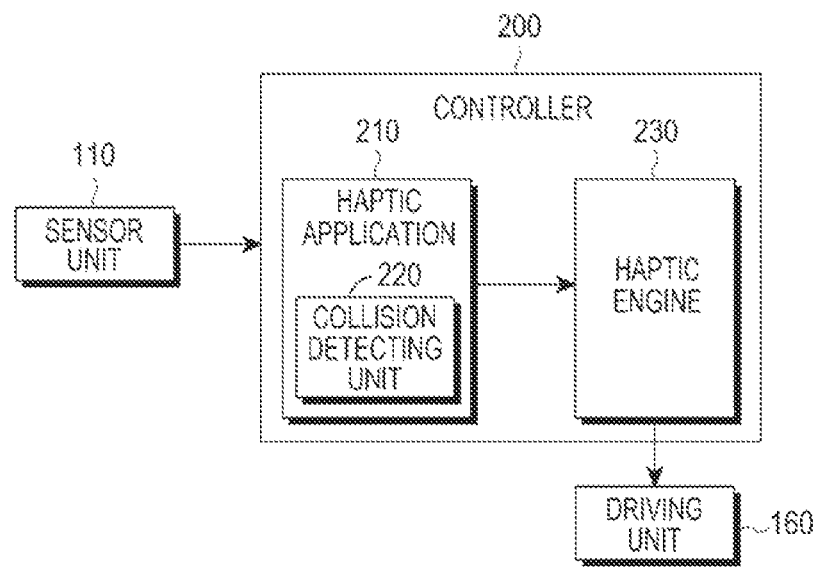
FIG. 2 illustrates a detailed configuration of a controller of FIG. 1.

FIG. 2 illustrates a detailed configuration of the controller 200, which includes a haptic application 210 and a haptic engine 230.

The controller 200 executes the haptic application 210 based on a user selection, and the haptic application 210 receives user input data and generates an event based on the user input data. The haptic application 210 performs rendering or image processing based on the event and a process that is being executed, and outputs, to the display unit 120, image data associated with the rendering or image processing. The haptic application 210 generates sound data based on the event and a process that is being executed, and outputs the generated sound data to the speaker 130.

A collision detecting unit 220 is included in the haptic application 210. When the event corresponds to a collision event, the collision detecting unit 220 operates in cooperation with the haptic engine 230 executed by the controller 200, and transfers, to the haptic engine 230, collision data including physical parameters. For example, the collision detecting unit 220 may sense that two objects in a game are in contact by a user input and/or a process being executed (or an artificial intelligence engine), or may sense that the user input corresponds to a command that causes collision.

Referring to FIGS. 1 and 2, the haptic engine 230 generates haptic pattern data based on the collision data, and outputs the haptic pattern data to the driving unit 160.

The driving unit 160 generates a driving signal (that is, a driving voltage) based on the haptic pattern data received from the haptic engine 230, and outputs the driving signal to the actuator 170.

The actuator 170 generates vibration based on the driving signal. That is, the driving unit 160 applies a driving signal to the actuator 170, which generates vibration based on the applied driving signal. The driving signal is formed of a plurality of pulses based on a haptic pattern (that is, a vibration pattern). The user may experience a haptic feedback (that is, the vibration of the actuator 170) through a hand that touches or grips the haptic feedback apparatus 100.

Figure 3:
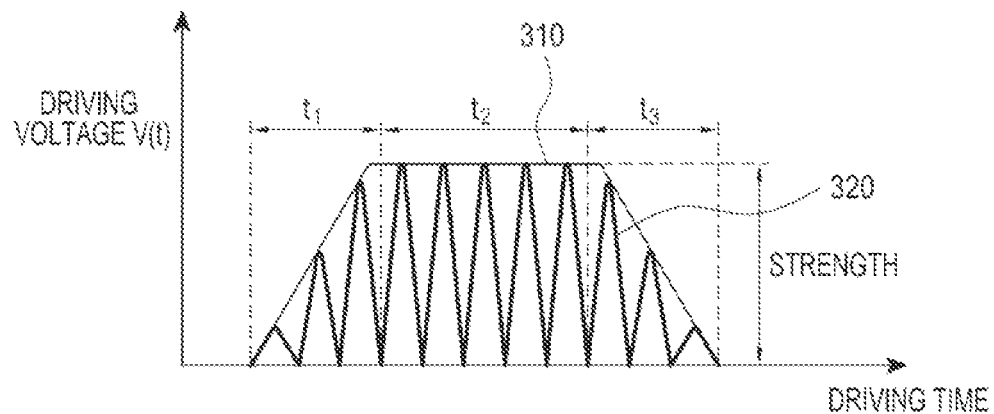
FIG. 3 illustrates a haptic pattern.

FIG. 3 illustrates a haptic pattern. As illustrated in FIG. 3, a haptic pattern 310 is an envelope curve associated with a driving voltage curve 320 over a driving time. That is, the driving voltage curve 320 is in a form of a pulse string enveloped by the haptic pattern 310. The haptic pattern 310 shows a general form of the driving voltage curve 320, that is, a general change in a driving voltage over time.

The driving voltage may be expressed by Equation (1) below. The driving voltage 320 and the haptic pattern 310 may correspond to each other and thus, a strength I(t) of the haptic pattern 310 may be expressed by F(event,impulse,$k_1$, $k_2$, ... ) in Equation (1) as follows.

$$V(t)=F(\text{event,impulse},k_1,k_2,\ldots) \quad (1)$$

In this example, V(t) denotes a driving voltage, event denotes a type of event, impulse denotes an impulse amount, and $k_1$, $k_2$, ... (that is, $k_i$) denotes physical parameters associated with collision. For example, the physical parameters may indicate stiffness values of objects in collision.

The haptic pattern 310 may have a basic pattern as shown in FIG. 3, and may be formed of the modification or combination thereof. The haptic pattern 310 may be formed of a rising part in which the strength gradually increases, a flat part in which the strength is constant, and a falling part in which the strength gradually decreases. The form of the haptic pattern 310 may be determined by adjusting a duration time $t_1$ of the rising part, a duration time $t_2$ of the flat part, and a duration time $t_3$ of the falling part. In this example, the strength of the rising part linearly increases and the strength of the falling part linearly decreases.

In FIG. 3, a maximum strength (that is, a maximum driving voltage) of the haptic pattern 310 may be automatically set based on an impulse amount (or force, or torque) from among physical parameters. The haptic pattern may have different forms based on a physical parameter, such as stiffness, and a type of event. The impulse amount is defined by a physical value that defines a strength of collision in a collision stage or a previous stage of the collision, such as a depth of collision, a collision time, a force of collision, a torque of collision, a variance in momentum of a collision target, a distance that the collision target or an elastic object (a rubber band or a spring) is pulled, a distance that the collision target or the elastic object is pressed, a mass of the collision target, a collision velocity, a direction of a movement of the collision target, a distance of a movement of the collision target, a collision angle, a stiffness of the collision target, or a pressure applied on the collision target.

For example, when a baseball is hit by a baseball bat gripped by a hand, the maximum strength of the haptic pattern may be determined based on an impulse amount. t1=0 since it is the collision between two targets (that is, objects) having a high stiffness, t2 is set to a duration time of the collision event (a frame duration time on a screen of the display unit 120 is a reference unit time), and t3=0 and active braking is used so as to avoid a residual vibration since attenuation may occur due to a hand after the collision (in the case of a motor, a few periods of sine wave vibrations may be generated by inverting a phase). When a frequency is adjustable as in a piezo-actuator, a driving frequency may be adjusted based the stiffness of the two colliding targets. That is, the controller 200 synchronizes the collision between the two targets shown on the screen of the display unit 120 and a haptic feedback (and sound), so that the haptic feedback is provided during the collision between the two targets.

The shape of the haptic pattern may be determined based on a type of event or a k value (a fixed physical parameter value associated with a collision target, for example, a stiffness value), in advance, and $t_1$, $t_2$, $t_3$, and the maximum strength may be determined based on a physical parameter value that varies in real time.

FIGS. 4A through 6B illustrate a change in a form of a haptic pattern based on the stiffness of collision targets. FIGS. 4A through 6B illustrate determining a form of a haptic pattern in a collision based on a stiffness of a collision target. A vibration form that an actuator may output may be constant, gradually increased, or gradually decreased. In addition, when active braking to remove a residual vibration is used at the time of completion, the vibration abruptly vanishes without the residual vibration. Thus, a situation in which the collision, such as impulse, is completed in a short time may be accurately expressed.

To distinguish a hard body and a soft body, a stiffness value of a collision target is compared to a threshold value. When the stiffness value of the collision target is greater than the threshold value, the collision target is regarded as a hard body (H). When the stiffness value of the collision target is less than or equal to the threshold value, the collision target is regarded as a soft body (S). The stiffness value may be expressed by a code value indicating a hard body or a soft body or a numerical value in a predetermined range.

Figures 4A, 4B:
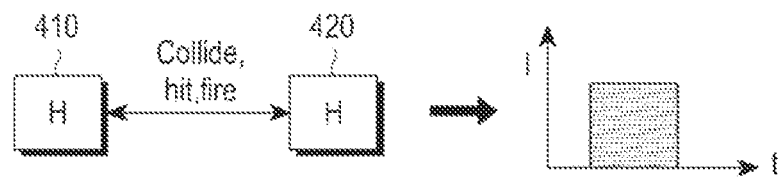

FIG. 4A illustrates the collision (hit or fire) between a first collision target 410 corresponding to H and a second collision target 420 corresponding to H. FIG. 4B illustrates that a form of a haptic pattern is provided in a quadrangular shape. In this example, $t_1$ and $t_3=0$ and active braking is used at an end point of $t_2$.

Figures 5A, 5B:
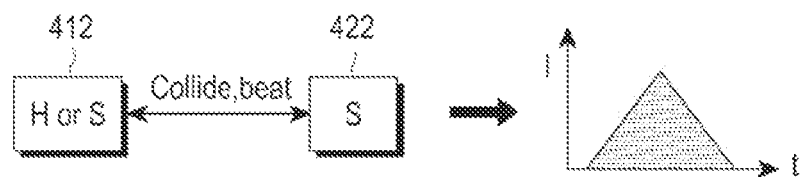

FIG. 5A illustrates the collision (or beat) between a first collision target 412 corresponding to H or S and a second collision target 422 corresponding to S. FIG. 5B illustrates that a form of a haptic pattern is provided in an isosceles triangular shape. In this example, $t_2=0$, a strength may vary based on a depth of collision, and active braking is used at an end point of $t_2$.

Figures 6A, 6B:
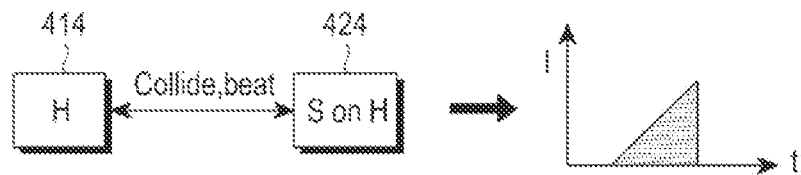

FIG. 6A illustrates the collision (or beat) between a first collision target 414 corresponding to H and a second collision target 424 corresponding to S on H. FIG. 6B illustrates that a form of a haptic pattern is provided in a right-angled triangular shape. In this example, $t_2$ and $t_3=0$ and active braking is used at an end point of $t_1$.

The haptic feedback apparatus 100 according to embodiments of the present invention may be applied to various applications. Examples in which the haptic feedback apparatus 100 is applied to a game application will be provided as follows.

Figure 7:
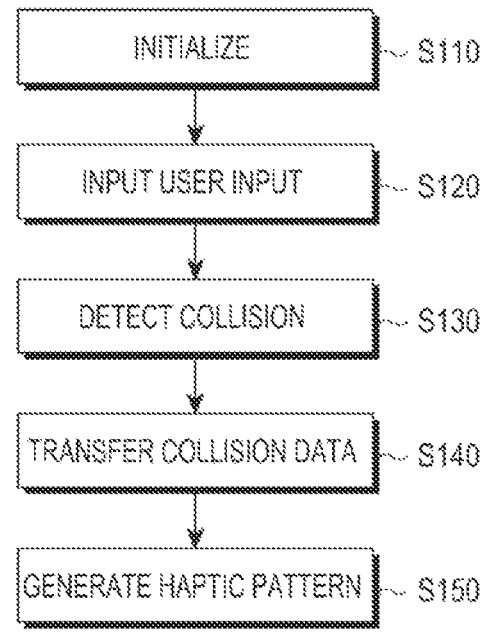
FIG. 7 illustrates a haptic pattern generating method according to an embodiment of the present invention.

FIG. 7 illustrates a haptic pattern generating method according to an embodiment of the present invention. The haptic pattern generating method includes steps of initializing S110, user input S120, collision-detecting S130, collision data transferring S140, and haptic pattern generating S150.

In the initializing step S110, the controller 200 extracts information associated with an impulse amount in a game stored in the memory 150, and matches a range of the impulse amount and a range of a strength of a haptic pattern, while loading the haptic application 210. The strength of the haptic pattern corresponds to a driving voltage of the actuator 170, which is limited to a value less than or equal to a threshold value and thus, the strength of the haptic pattern may be normalized so that the strength of the haptic pattern does not exceed the threshold value when the impulse amount is maximum.

For example, when the impulse amount is maximum, the strength of the haptic pattern may also be determined to be maximum. The impulse amount and the strength of the haptic pattern may correspond to a linear function or a logarithmic function based on a game characteristic. In this example, the impulse amount is defined to be a physical value that may define a strength of collision (such as a depth, a time, a force, a torque, a change in momentum, or a length that is pulled or pressed). The impulse amount may not merely define the collision between two targets, but may also define an elastic force or a pressure, such as pressing a spring or pulling a rubber band.

In the user input stage S120, the sensor unit 110 detects an input of a user and transfers the detected user input data to the haptic application 210, which receives the user input data and generates an event based on the user input data. For example, the user inputs, using a keypad, a command to strike a face of a partner with a fist in a fighting game, a command to hit a ball in a baseball game, a command to hit a ball in billiards, or a command to pull a rubber band of a slingshot. The haptic application 210 generates an event based on the user input.

In the collision detecting step S130, the collision detecting unit 220 determines whether the event corresponds to a collision event.

In the collision data transferring step S140, the collision detecting unit 220 transfers, to the haptic engine 230, collision data when the event corresponds to the collision event. In the present example, a driving voltage may be expressed by Equation (2), as follows.

$$V(t)=F(\text{impulse},e,d,k_1,k_2,r) \qquad (2)$$

In this example, V(t) denotes a driving voltage, impulse denotes an impulse amount, e denotes a type of event, d denotes a detailed type of event (a factor that determines a form of a haptic pattern using classification based on a fixed physical parameter value k), $k_1$ denotes a stiffness value of a first collision target, $k_2$ is a stiffness value of a second collision target, and r denotes a number of pattern repetitions.

The collision detecting unit 220 transfers, to the haptic engine 230, the collision data including impulse, e, d, $k_1$, $k_2$, and r.

In the haptic pattern generating step S150, the haptic engine 230 generates haptic pattern data based on the collision data, and outputs the haptic pattern data to the driving unit 160.

FIGS. 8A through 11B illustrate various haptic patterns based on a type of game.

FIGS. 8A and 8B are associated with when a face is struck by a fist in a fighting game. FIG. 8A illustrates a screen of the display unit 120, and FIG. 8B illustrates a haptic pattern.

Referring to Equation 2, e=3(collision), d=2(hard—soft on hard), $k_1$(fist)=$_1$(hard), $k_2$(face)=0(soft), r=0(default), and impulse is set to f corresponding to a force value that is proportional to a depth x by which the collision targets overlap each other.

A cheek has a quality of a soft material attached to a bone. Thus, a haptic pattern may be in a gradually rising form, and a strength I of the haptic pattern may be changed based on a depth by which the two targets overlap each other (or a velocity of a movement of the fist).

FIG. 8B illustrates that a form of the haptic pattern is provided in a right-angled triangular shape. This is the case in which the fist corresponding to a hard body strikes the cheek corresponding to a soft body which is attached on the bone corresponding to a hard body. Thus, the haptic pattern may be in a gradually rising form. In this example, $t_2$ and $t_3=0$ and active braking is used at an end of $t_1$.

FIGS. 9A and 9B are associated with when a baseball is hit by a bat in a baseball game. FIG. 9A illustrates a screen of the display unit 120, and FIG. 9B illustrates a haptic pattern.

Referring to Equation 2, e=3(collision), d=1(hard-hard), $k_1$(bat)=1(hard), $k_2$(baseball)=1(hard), r=0(default), and impulse is set to $\Delta$(mv) corresponding to a variation in momentum of a baseball.

FIG. 9B illustrates that a form of the haptic pattern is provided in a quadrangular shape. This is the case in which the bat corresponding to a hard body hits the baseball corresponding to a hard body, the haptic pattern has a form in which a strength I is uniform. In this example, $t_1$ and $t_3=0$ and active braking is used at an end of $t_2$.

FIGS. 10A and 10B are associated with when a ball is hit by a cue in billiards. FIG. 10A illustrates a screen of the display unit 120, and FIG. 10B illustrates a haptic pattern.

Referring to Equation (2), e=3(collision), d=1(hard-hard), $k_1$(cue)=1(hard), $k_2$(cue)=1(hard), r=0(default), impulse is set to $\Delta$(mv) corresponding to a variation in momentum of a ball.

FIG. 10B illustrates that a form of the haptic pattern is provided in a quadrangular shape. This is the case in which the cue corresponding to a hard body hits a ball corresponding to a hard body and thus, the haptic pattern may have a form in which a strength I is uniform. In this example, $t_1$ and $t_3=0$, and active braking is used at an end of $t_2$.

Referring to FIGS. 9 and 10, two targets that collide with each other are hard bodies when a ball is hit, allowing a form of a haptic pattern to have a uniform strength. A duration time $t_2$ of a flat part of the haptic pattern may be adjusted based on an impulse amount at the time of hitting (expressed as a variation in momentum). The impulse amount is significantly large and a time is significantly short at the time of hitting.

In an actuator that provides only a limited vibratory force, the vibration pattern may not be embodied and thus, the impulse amount may be reflected to the duration time (that is, a driving time) as opposed to the strength of the haptic pattern (that is, a driving voltage). Whether the impulse amount is to be reflected to the strength or to the duration time may be determined, in advance, based on an event. As illustrated in the foregoing, since the impulse amount of batting in the baseball game is greater than the impulse amount of batting in the billiards, the duration time $t_2$ of the flat part of the haptic pattern of FIG. 9B is 50 ms and the duration time $t_2$ of the flat part of the haptic pattern of FIG. 10B is 25 ms.

FIGS. 11A and 11B are associated with when a rubber band of a slingshot is pulled in a shooting game. FIG. 11A illustrates a screen of the display unit 120 and FIG. 11B illustrates a haptic pattern. In the present example, a type of event may be classified as the transformation or deformation of an elastic body.

Referring to Equation (2), e=4(spring), d, $k_1$, $k_2$=default, r=0(default), and impulse is set to f, that is, a force value corresponding to a multiplication of a modulus of elasticity and a distance $\Delta x$ that is pulled.

FIG. 11B illustrates that a form of the haptic pattern is provided in a right-angled triangular shape, and the haptic pattern has a gradually rising form. In this example, $t_2$ and $t_3=0$ and active braking is not used. A strength I of the haptic pattern may increase based on a distance of a rubber band (or a spring) that is pulled.

As described in the foregoing, the form of the haptic pattern, a use of an impulse amount (whether the impulse amount is to be used for the strength or the duration time), whether active braking is to be used may be determined based on a type of event (e and d) or a fixed physical parameter value, and the strength and the duration time of the haptic pattern may be determined based on a physical parameter value that varies in real time.

Highly realistic games using a physics engine are currently being released. The embodiments of the present invention automatically embody a haptic effect based on an actual physical parameter so that reality and immersion may be improved when compared to a conventional game. Also, a haptic feedback is automatically performed and thus, an environment where a game program developer may readily develop a game that operates haptic feedback may be provided.

The above-described embodiments of the invention may be embodied as hardware, software or a combination of hardware and software. Software may be stored in a volatile or non-volatile storage device such as Read Only Memory (ROM) and the like irrespective of erasing or rewriting, a memory such as a Random Access Memory (RAM), a memory chip, a device, and a integrated circuit, or a storage medium that is capable of performing optical or magnetic recording and machine-reading such as Compact Disc (CD), Digital Versatile Disc (DVD), optical disc, and magnetic tape. A memory may be an example of machine-readable storage media that are suitable for storing a program including instructions to implement the embodiments, or programs. Therefore, the invention may include a program including a code to implement an apparatus or a method claimed in a claim of the specification, and a machine-readable storage medium including the program, for example, a computer-readable storage medium. The program may be transferred electronically through a medium such as a communication signal transferred through a wired or wireless connection, and the invention may appropriately include an equivalent medium.

The haptic feedback apparatus may receive a program from a program providing device that is a wiredly or wirelessly connected, and may store the program. The program providing device may include a program including instructions to instruct the haptic feedback apparatus to perform a haptic feedback method, a memory storing information required for the haptic feedback method and the like, a communication unit to perform wired or wireless communication with the haptic feedback apparatus, and a controller to transmit the program to the haptic feedback apparatus, automatically or in response to the request from the haptic feedback apparatus.

While the invention has been shown and described with reference to certain embodiments thereof, it will be understood by those skilled in the art that various changes in form and details may be made therein without departing from the spirit and scope of the invention as defined by the appended claims.

What is claimed is:
1. A haptic feedback method, the method comprising:
obtaining information on an impulse amount range of collisions from an application stored in a memory;
matching the impulse amount range and a strength range of haptic patterns;
providing a user with an image of the application that is updated based on a collision event;
obtaining information on the collision event;

generating a haptic pattern based on the information on the collision event; and generating vibration based on the haptic pattern, wherein the collision event is caused by a collision between a first object and a second object in the image, and wherein generating the haptic pattern includes:

determining a maximum strength of the haptic pattern within the strength range corresponding to an impulse amount of the collision within the impulse amount range;

if the collision between the first object and the second object is a collision between hard bodies, generating a rectangular haptic pattern; and if the collision between the first object and the second object is a collision between soft bodies or a collision between a hard body and a soft body, generating a triangular haptic pattern.

2. The method of claim 1, further comprising:

receiving an input from the user, wherein the collision is generated based on the user input.

3. The method of claim 2, further comprising:

generating an event based on the user input; and determining whether the generated event corresponds to the collision event.

4. The method of claim 1, wherein the haptic pattern has a duration time associated with an impulse amount of the collision.

5. The method of claim 1, wherein generating the haptic pattern further includes:

identifying a combination of the first object and the second object by comparing stiffness values of the first object and the second object with a predetermined threshold value, wherein the combination of the first object and the second object corresponds to one of a first combination of hard bodies, a second combination of soft bodies, and a third combination of a hard body and a soft body.

6. A non-transitory machine-readable storage medium storing a program causing a processor to execute a haptic feedback method, the method comprising;

obtaining information on an impulse amount range of collisions from an application stored in a memory;

matching the impulse amount range and a strength range of haptic patterns;

providing a user with an image of the application that is updated based on a collision event;

obtaining information on the collision event;

generating a haptic pattern based on the information on the collision event; and generating vibration based on the haptic pattern, wherein the collision event is caused by a collision between a first object and a second object in the image, and wherein generating the haptic pattern includes:

determining a maximum strength of the haptic pattern within the strength range corresponding to an impulse amount of the collision within the impulse amount range;

if the collision between the first object and the second object is a collision between hard bodies, generating a rectangular haptic pattern; and if the collision between the first object and the second object is a collision between soft bodies or a collision between a hard body and a soft body, generating a triangular haptic pattern.

7. The non-transitory machine-readable storage medium of claim 6, wherein generating the haptic pattern further includes:

identifying a combination of the first object and the second object by comparing stiffness values of the first object and the second object with a predetermined threshold value, wherein the combination of the first object and the second object corresponds to one of a first combination of hard bodies, a second combination of soft bodies, and a third combination of a hard body and a soft body.

8. A haptic feedback apparatus, the apparatus comprising:

a display unit configured to provide a user with an image of an application that is updated based on a collision event;

a controller configured to obtain information on an impulse amount range of collisions from the application stored in a memory, match the impulse amount range and a strength range of haptic patterns, obtain information on the collision event, and generate a haptic pattern based on the information on the collision event; and an actuator configured to generate a vibration based on the haptic pattern, wherein the collision event is caused by a collision between a first object and a second object in the image, and wherein the controller is further configured to:

determine a maximum strength of the haptic pattern within the strength range corresponding to an impulse amount of the collision within the impulse amount range;

if the collision between the first object and the second object is a collision between hard bodies, generate a rectangular haptic pattern; and if the collision between the first object and the second object is a collision between soft bodies or a collision between a hard body and a soft body, generate a triangular haptic pattern.

9. The apparatus of claim 8, further comprising:

a sensor unit configured to detect an input of the user, wherein the collision is generated based on the user input.

10. The apparatus of claim 9, wherein the controller is further configured to:

generate an event based on the user input, and determine whether the generated event corresponds to a collision event.

11. The apparatus of claim 8, wherein the haptic pattern has a duration time associated with an impulse amount of the collision.

12. The apparatus of claim 8, wherein the controller is further configured to:

identify a combination of the first object and the second object by comparing stiffness values of the first object and the second object with a predetermined threshold value, wherein the combination of the first and second objects corresponds to one of a first combination of hard bodies, a second combination of soft bodies, and a third combination of a hard body and a soft body.

* * * * *